INVENTORS
William Robertson
BY and Louis W. Higgins
Daniel G. Cullen

Sept. 30, 1947.  W. ROBERTSON ET AL  2,428,322
PANELBOARD OF DETACHABLY MOUNTED SWITCHING DEVICES
Filed Sept. 9, 1944  3 Sheets-Sheet 3
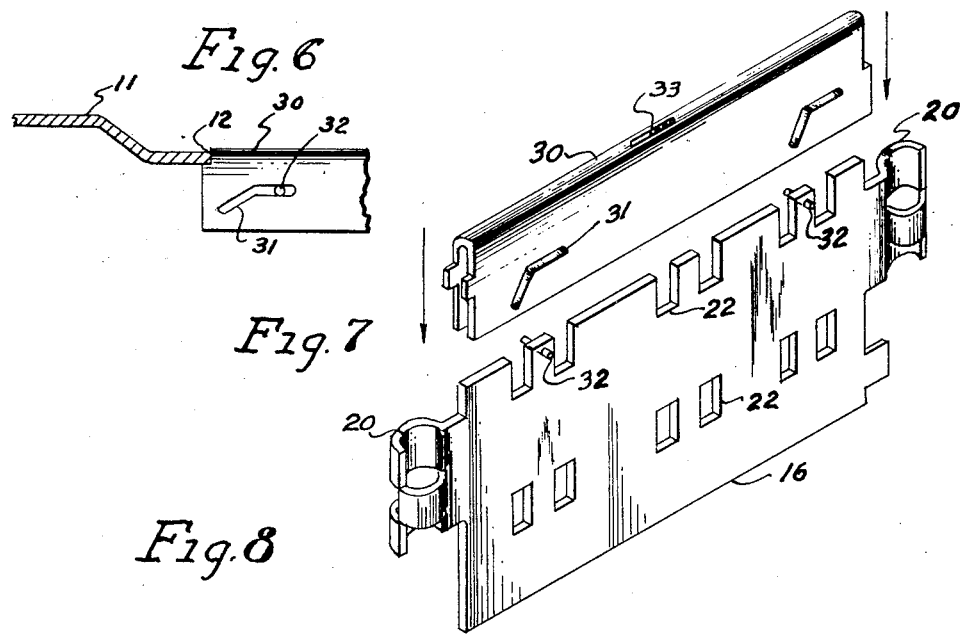
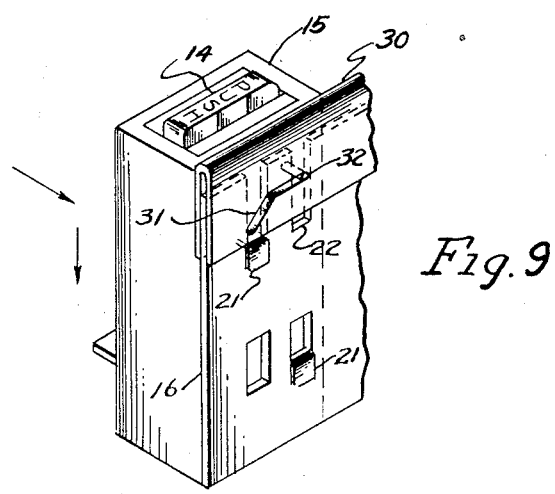
INVENTORS
William Robertson
BY and Louis W. Higgins
Daniel G. Cullen.

Patented Sept. 30, 1947

2,428,322

UNITED STATES PATENT OFFICE 2,428,322

PANELBOARD OF DETACHABLY MOUNTED SWITCHING DEVICES

William Robertson and Louis W. Higgins, Detroit, Mich., assignors to Bulldog Electric Products Company, Detroit, Mich., a corporation of West Virginia Application September 9, 1944, Serial No. 553,301

10 Claims. (Cl. 175—308)

REISSUED

OCT 18 1949

1

This application relates to panelboards. The disclosure of this application in some respects resembles the disclosure in a prior application Serial No. 452,128, filed July 24, 1942.

For an understanding of the panelboard herein disclosed, reference should be had to the appended drawings.

In these drawings,

Fig. 6 is a fragmentary view.

Figs. 7 and 8 show a cam-lock plate and a mounting plate in detail and in conjunction.

Fig. 9 is an illustrative perspective view.

Figure 1:
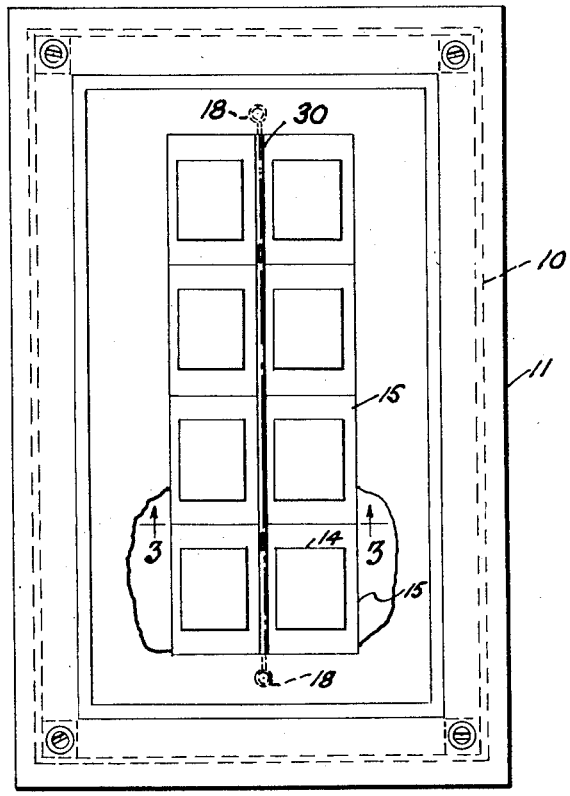
Fig. 1 shows a panelboard with the front cover thereof partly cut away to expose the front surfaces of switch units therein.
Figure 2:
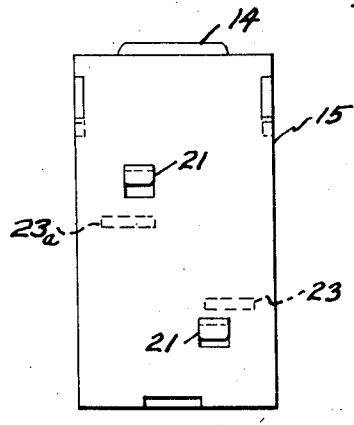
Fig. 2 is a back view of one of the units.
Figure 3:
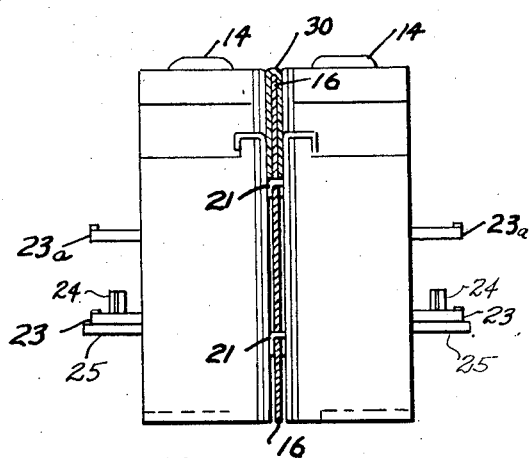
Fig. 3 shows two units, back to back, and is a view as if on line 3—3, Fig. 1.
Figure 4:
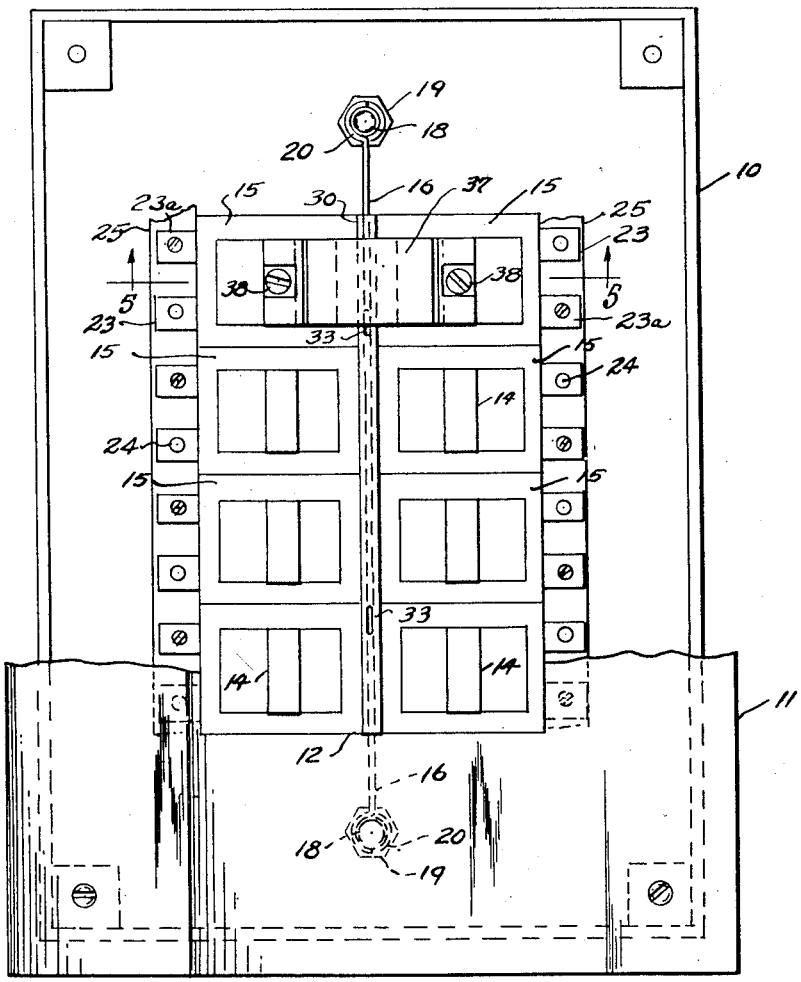
Fig. 4 shows the panelboard in greater detail.
Figure 5:
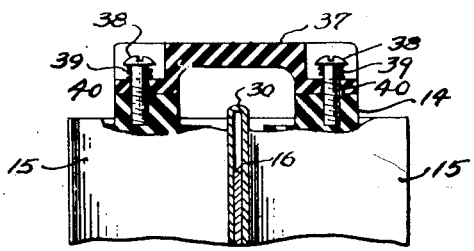
Fig. 5 is a section on line 5—5 of Fig. 4.

The drawings show a panelboard consisting of a box 10 whose front open surface is covered by a front cover 11 having a large center hole 12 through which may forwardly project the push buttons 14 of switches 15 mounted on the forwardly projecting mounting plate 16, in turn mounted on studs 18, fastened to the back of the box 10, these studs having hold down nuts 19, and passing through loops 20 of the plate 16.

Two rows of switches are arranged, one on each side of the plate 16, back to back in pairs. At their diagonally opposed corners are hooks 21 disposed in holes 22 formed in the plate 16. The hooks are so arranged that the push on the button 14 for each switch tends to push that switch away from the front of the panel and thus enhance the grip of the hooks on the plate. The switches may be assembled or mounted on a plate 16 simply by moving them laterally so that hooks 21 enter holes 22, and then pushing the switches towards the back of the panel. For disassembly the switches are first pulled forwardly towards cover 11 and then laterally.

Projecting laterally from the front of the switches are line and load terminals 23—23a. The line terminals have holes gripping and receiving resilient pins 24 formed on the bus bars 25 whereby the switches may be electrically and mechanically connected to the bus bars merely by pushing the switches back onto the bus bars.

For locking the switches in place on the plate 16, and functioning as a trim strip, to fill the space between the switches, is a U-shaped strip 30 which embraces the forward edge of plate 16 and whose lower edges overlie the tongues 21,

2 and whose sides have cam slots 31 receiving pins 32 of the plate 16. Strip 30 may be moved longitudinally, and thus moving will move toward or way from the front 11, thus freeing or locking the switches to the plate 16 by permitting or restraining movement of the switches towards the cover 11. The strip functions mainly to prevent the switches moving towards the cover 11 by blocking the movement of the tongues 21 out of the mounting plate holes 22.

The strip 30 has slots 33 for the blade of a tool which facilitates movement of the strip 30 endwise. These slots may be omitted, however, in which case the ends of the strip may be engaged by a tool for that purpose. Strip 30 fills the space between the rows of devices and thus acts as a trim or ornamental strip.

To lock strip 30 against endwise movement, the edge of hole 12 of cover 11 is formed to engage the ends of the strip when the cover is in place on the box.

In the panel shown, two of the handles 14 are connected for common actuation, as a two pole switch by a two pole tie-bar 37 formed in a manner to give clearance to the strip 30 for movement towards or away from the cover 11 as necessary. The bar 37 is fastened to the handles 14 by bolts 38 threaded into the handles and surrounded by springs 39. The bolts pass through clear holes 40 of the tie-bar.

It will be observed that when strip 30 is moved so as to free the switches 15 and permit them to be removed from the mounting plate, a pair of switches joined by a tie-bar 37 may be removed from the mounting plate as a unit, first by being pulled towards the front of the box, whereupon the two switches may be moved slightly apart, as permitted by the spring mounting at 39, so that the hooks 21 clear the mounting plate and thus permit the two switches 15 to be removed from the mounting plate while still connected to each other by the tie-bar 17, which functions as a handle for removing the two switches simultaneously.

Now having described the panelboard herein disclosed, reference should be had to the claims which follow:

We claim:

1. A panelboard comprising a box, having a back and ends, and switching devices arranged back to back in two rows which are side by side and centrally disposed therein, and a thin mounting plate perpendicular to the back and ends of the box, the plate being between and on which are mounted the two rows of devices, the mounting means comprising front manipulable formations on the backs of the devices cooperating with formations of the plate, and front manipulable means movably mounted on the plate for locking the devices against removal from the plate, the means engaging the formations and also filling and trimming the space between the rows of devices.

2. A panelboard comprising a box, having a back and ends, and switching devices arranged back to back in two rows which are side by side and centrally disposed therein, and a thin mounting plate perpendicular to the back and ends of the box, the plate being between and on which are mounted the two rows of devices, the mounting means comprising front manipulable formations on the backs of the devices cooperating with formations of the plate, and front manipulable means movably mounted on the plate for locking the devices against removal from the plate, the means engaging the formations and also filling and trimming the space between the rows of devices, and comprising a strip arranged to be moved manually towards and away from the formations to block or to release them.

3. A panelboard comprising a box, having a back and ends, and switching devices arranged back to back in two rows which are side by side and centrally disposed therein, and a thin mounting plate perpendicular to the back and ends of the box, the plate being between and on which are mounted the two rows of devices, the mounting means comprising front manipulable formations on the backs of the devices cooperating with formations of the plate, and front manipulable means movably mounted on the plate for locking the devices against removal from the plate, the means engaging the formations and also filling and trimming the space between the rows of devices, and comprising a strip arranged to be moved manually towards and away from the formations to block or to release them, the strip being moved for this purpose longitudinally along the forward edge of the plate as well as rearwardly towards the formations or forwardly away from them.

4. A panelboard comprising a box, having a back and ends, and switching devices arranged back to back in two rows which are side by side and centrally disposed therein, and a thin mounting plate perpendicular to the back and ends of the box, the plate being between and on which are mounted the two rows of devices, the mounting means comprising front manipulable formations on the backs of the devices cooperating with formations of the plate, and front manipulable means movably mounted on the plate for locking the devices against removal from the plate, the means engaging the formations and also filling and trimming the space between the rows of devices, and comprising a strip arranged to be moved manually towards and away from the formations to block or to release them, the strip being moved for this purpose longitudinally along the forward edge of the plate as well as rearwardly towards the formations or forwardly away from them, and a panel front plate arranged to engage the strip to lock it against releasing movement, and fasteners for removably holding down the front plate.

5. A panelboard comprising a box, having a back and ends, and switching devices arranged back to back in two rows which are side by side and centrally disposed therein, and a thin mounting plate perpendicular to the back and ends of the box, the plate being between and on which are mounted the two rows of devices, the mounting means comprising front manipulable formations on the backs of the devices cooperating with formations of the plate, and front manipulable means movably mounted on the plate for locking the devices against removal from the plate, the means engaging the formations and also filling and trimming the space between the rows of devices, and comprising a strip arranged to be moved manually towards and away from the formations to block or to release them, the strip being channel shaped to embrace the forward edge of the plate.

6. A panelboard comprising a box having a back and ends, bus bars therein, switching devices arranged back to back in two rows which are side by side and centrally disposed therein, and a thin mounting plate perpendicular to the back and ends of the box, the plate being between the bus bars and the two rows of devices, cooperating front manipulable formations on the plate and the devices formed to permit the devices to be mounted on and secured to the mounting plate by being pushed thereon from the front of the box towards the back, and front manipulable cooperating formations on the devices and bus bars formed to permit the devices to be mounted on and secured to the bus bars by being pushed thereon from the front of the box towards the back.

7. A panelboard comprising a box having a back and ends, bus bars therein, switching devices arranged back to back in two rows which are side by side and centrally disposed therein, and a thin mounting plate perpendicular to the back and ends of the box, the plate being between the bus bars and the two rows of devices, cooperating front manipulable formations on the plate and the devices formed to permit the devices to be mounted on and secured to the mounting plate by being pushed thereon from the front of the box towards the back, and front manipulable cooperating formations on the devices and bus bars formed to permit the devices to be mounted on and secured to the bus bars by being pushed thereon from the front of the box towards the back, with the parts being so arranged that the devices are mounted on the mounting plate and bus bars simultaneously and with but one mounting manipulation.

8. A panelboard comprising a box, switching devices, bus bars, and a mounting plate, cooperating formations on the devices and the mounting plate formed to permit the devices to be mounted on and secured to the mounting plate by being pushed thereon from the front of the box towards the back, and cooperating formations on the devices and bus bars formed to permit the devices to be mounted on and secured to the bus bars by being pushed thereon from the front of the box towards the back, with the parts being so arranged that the devices are mounted on the mounting plate and bus bars simultaneously and with but one mounting manipulation, the mounting plate being a thin plate perpendicular to the back of the box, with the devices being arranged in rows on opposite sides of the plate.

9. A panelboard comprising a box, switching devices, bus bars, and a mounting plate, cooperating formations on the devices and the mounting plate formed to permit the devices to be mounted on and secured to the mounting plate by being pushed thereon from the front of the box towards the back, and cooperating formations on the devices and bus bars formed to permit the devices to be mounted on and secured to the bus bars by being pushed thereon from the front of the box towards the back, with the parts being so arranged that the devices are mounted on the mounting plate and bus bars simultaneously and with but one mounting manipulation, the mounting plate being a thin plate perpendicular to the back of the box, with the devices being arranged in rows on opposite sides of the plate, the bus bars being on opposite sides of the plate and parallel to the back of the box.

10. A panelboard comprising a box having a back and ends, switching devices arranged back to back in two rows which are side by side and centrally disposed therein, and a thin mounting plate perpendicular to the back and ends of the box, the plate being between the two rows of devices, cooperating front manipulable formations on the plate and the devices formed to permit the devices to be mounted on and secured to the mounting plate by being pushed thereon from the front of the box towards the back and means movably mounted on the plate, and disposed between the rows of devices, for releasably locking the devices against removal from the plate, and filling and trimming the space between the rows of devices.

WILLIAM ROBERTSON.
LOUIS W. HIGGINS.

REFERENCES CITED

The following references are of record in the file of this patent:

UNITED STATES PATENTS

| Number | Name | Date |
|---|---|---|
| 2,103,325 | Frank et al. | Dec. 28, 1937 |
| 2,359,247 | Rowe | Sept. 26, 1944 |
| 1,271,641 | Werwath | July 9, 1918 |
| 1,426,921 | Smith | Aug. 22, 1922 |
| 1,296,653 | Griswold | Mar. 11, 1919 |
| 2,268,619 | Reid | Jan. 6, 1942 |